United States Patent
Gilkes et al.

(10) Patent No.: US 6,700,535 B2
(45) Date of Patent: Mar. 2, 2004

(54) LOCATION ESTIMATION IN NARROW BANDWIDTH WIRELESS COMMUNICATION SYSTEMS

(75) Inventors: Alan M. Gilkes, Plano, TX (US); Carl M. Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/872,598

(22) Filed: Jun. 1, 2001

(65) Prior Publication Data

US 2002/0180640 A1 Dec. 5, 2002

(51) Int. Cl.[7] .............................................. G01S 1/24
(52) U.S. Cl. ........................ 342/387; 342/457; 342/465
(58) Field of Search ........................ 342/357.01, 357.06, 342/387, 465, 457

(56) References Cited

U.S. PATENT DOCUMENTS

| | | | |
|---|---|---|---|
| 3,983,559 A | * 9/1976 | Honore et al. | 343/105 R |
| 4,422,076 A | * 12/1983 | Tricoles et al. | 343/458 |
| 4,533,871 A | 8/1985 | Boetzkes | 324/207 |
| 4,626,860 A | * 12/1986 | Tricoles et al. | 342/442 |
| 4,864,313 A | 9/1989 | Konneker | 342/457 |
| 5,126,748 A | * 6/1992 | Ames et al. | 342/353 |
| 5,317,323 A | 5/1994 | Kennedy et al. | 342/457 |
| 5,493,308 A | 2/1996 | Bingham et al. | 342/442 |
| 5,589,838 A | 12/1996 | McEwan | 342/387 |
| 5,890,068 A | 3/1999 | Fattouche et al. | 455/456 |
| 6,127,975 A | * 10/2000 | Maloney | 342/457 |
| 6,304,210 B1 | * 10/2001 | Allison et al. | 342/357.08 |

FOREIGN PATENT DOCUMENTS

| | | | |
|---|---|---|---|
| DE | 3516357 | 11/1986 | H04B/7/26 |
| WO | WO 95/26510 | 5/1995 | G01S/5/06 |
| WO | WO 97/22888 | 6/1997 | G01S/5/04 |
| WO | WO 00/38460 | 6/2000 | G01S/5/00 |
| WO | WO 01/23904 | 5/2001 | G01S/5/00 |
| WO | WO 01/58098 | 8/2001 | H04L/12/56 |

OTHER PUBLICATIONS

"Networks for Homes", Amitava Dutta–Roy, IEEE Spectrum, Communications, Dec. 1999, pp. 26–33.

"Specification of the Bluetooth System", The ad hoc SCATTERNET for affordable and Highly functional wireless connectivity, V1.0A, Jul. 26, 1999, pp. 1–1.068.

* cited by examiner

Primary Examiner—Dao Phan
(74) Attorney, Agent, or Firm—Carlton H. Hoel; W. James Brady; Frederick J. Telecky, Jr.

(57) ABSTRACT

The phase difference between a known stable reference signal (11) and a known signal output by a wireless mobile communication device (5, 5B) is determined at several known locations (1–4, 1B–4B). The location of the wireless mobile communication device is then determined from the phase difference information. Also, the approximate location of a wireless mobile communication device (5A) can be estimated by transmitting a message from the device at a predetermined power level (71), and determining where among a plurality of predetermined locations (1A–4A) the transmitted message has been received.

20 Claims, 6 Drawing Sheets

LOCATION ESTIMATION IN NARROW BANDWIDTH WIRELESS COMMUNICATION SYSTEMS

FIELD OF THE INVENTION

The invention relates generally to location determination in wireless communications and, more particularly, in narrow bandwidth wireless communication systems.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the license-free 2.4 GHz band and advantageously offers short-range wireless communication between Bluetooth devices without the need for a central network.

The Bluetooth system provides a 1 Mb/sec data rate with low energy consumption for battery powered devices operating in the 2.4-GHz ISM (industrial, scientific, medical) band. The current Bluetooth system provides a 10-meter range and a maximum asymmetric data transfer rate of 723 kb/sec. The system supports a maximum of three voice channels for synchronous, CVSD-encoded transmission at 64 kb/sec. The Bluetooth system treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Any Bluetooth device can assume the role of master or slave. For example, typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Frequency hopping permits operation in noisy environments and permits multiple piconets to exist in close proximity. The frequency hopping scheme permits up to 1600 hops per second over 79 1-MHZ channels or the entire 2.4-GHz ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

Techniques have been developed for identifying the geographic location of a wireless communication device, for example, in emergency situations or to provide travel directions. However, these techniques can be particularly difficult to implement when the devices are operating indoors. Global Positioning System (GPS) satellite reception may be impossible, and wireless telephony may be difficult at best in many locations, such as the inside of factories, high-rise buildings, parking garages, shopping malls, subway/train stations and airport terminals.

It is therefore desirable to provide the capability of identifying the geographic location of a wireless mobile communication device that is operating indoors.

Many conventional approaches to precision location identification make use of so-called "time of arrival" techniques. One difficulty with time of arrival techniques is the uncertainty of time, which can occur at several locations. For example, if it is desired to locate a particular wireless mobile communication device, and that device broadcasts a beacon in several time slots, with each time slot dedicated to a respective base station, then the uncertainty of the wireless mobile communication device's clock can be a source of error in the location identification operation. If the base stations are operated with respectively independent clocks, then the uncertainty associated with the independent clocks can also be a source of error in the location identification operation.

It is therefore desirable to provide location identification techniques that avoid disadvantageous time uncertainties.

Some conventional techniques utilize a wide frequency signal for location identification. Such a wide bandwidth signal permits a very narrow pulse width, the timing of which can be precisely measured. However, this wide bandwidth signal is not available in narrow bandwidth wireless communication systems such as Bluetooth systems. For example, the communication bandwidth in Bluetooth systems is only 1 MHz. Therefore, the smallest bit length is 1 microsecond. Disadvantageously, an error of 1 microsecond in timing corresponds to a distance uncertainty of 300 meters ($3 \times 10^8$ meters/second $\times 10^{-6}$ seconds). Another problem encountered in systems such as Bluetooth is that the preamble defined by the Bluetooth protocol is only long enough to insure that all data bits are sampled without error. There is no determination of the start of a bit, or definition of the bit edge.

It is therefore desirable to improve the precision of location identification in narrow bandwidth wireless communication systems.

It is also desirable in view of the foregoing to provide location identification techniques that do not require the capability of determining a start bit or defining a bit edge.

The present invention determines, at several known locations, the phase difference between a known stable reference signal and a known signal output by the wireless mobile communication device that is being located. The location of the wireless communication device can be determined from the phase difference information obtained at the predetermined locations. This advantageously permits precise location estimation indoors, using a relatively narrow bandwidth signal, and also advantageously avoids the aforementioned problems of time uncertainties and bit definition. Further according to the invention, the approximate location of a wireless mobile communication device can be estimated by transmitting a message from the device at a predetermined power level, and determining where among a plurality of predetermined locations the transmitted message has been received.

DETAILED DESCRIPTION

The present invention recognizes two possible approaches to precision location estimation in narrow bandwidth systems. A first approach is the use of spread spectrum waveforms. A spread spectrum waveform can be sent, for example in a conventional Bluetooth data packet. A Barker code could be used for such a spread spectrum application, because all of its compressed-pulse time sidelobes are of uniform size, and the peak value is the bit-length (or processing gain). The use of a compressed pulse would permit precision location (by a factor of the processing gain) using a comparator to find the exact sample time. Although the longest Barker code is 13 bits, Barker codes can be concatenated by multiplying each successive Barker code by another. For example, a length 3 Barker code can be multiplied (convolved) with a length 13 Barker code to generate a unique code of 36 bits.

To determine the exact bit transition in the spread spectrum waveform, the waveform must be oversampled by several factors of the bit rate. In fact, each bit transmitted by the mobile device that is being located would need to be oversampled, and the time position of the bits would need to be determined within nanoseconds. It can therefore be seen that the use of spread spectrum waveforms can be expected to require an undesirably large amount of signal processing.

Another approach according to the present invention is to match the phase of a narrowband signal (transmitted by the mobile device to be located) with a network timing reference. For example, a 1 MHz signal will have a 1 microsecond periodicity. As long as the geographical distances within the location estimation environment are less than 300 meters, the phase of the 1 MHz signal can be detected (relative to a common reference signal) at each of a plurality of known locations, and the distances to the respective locations can then be calculated from the relative phases detected at those locations. Each of the detected phases will be different from the others, and this will provide the needed positioning information.

Figure 1:
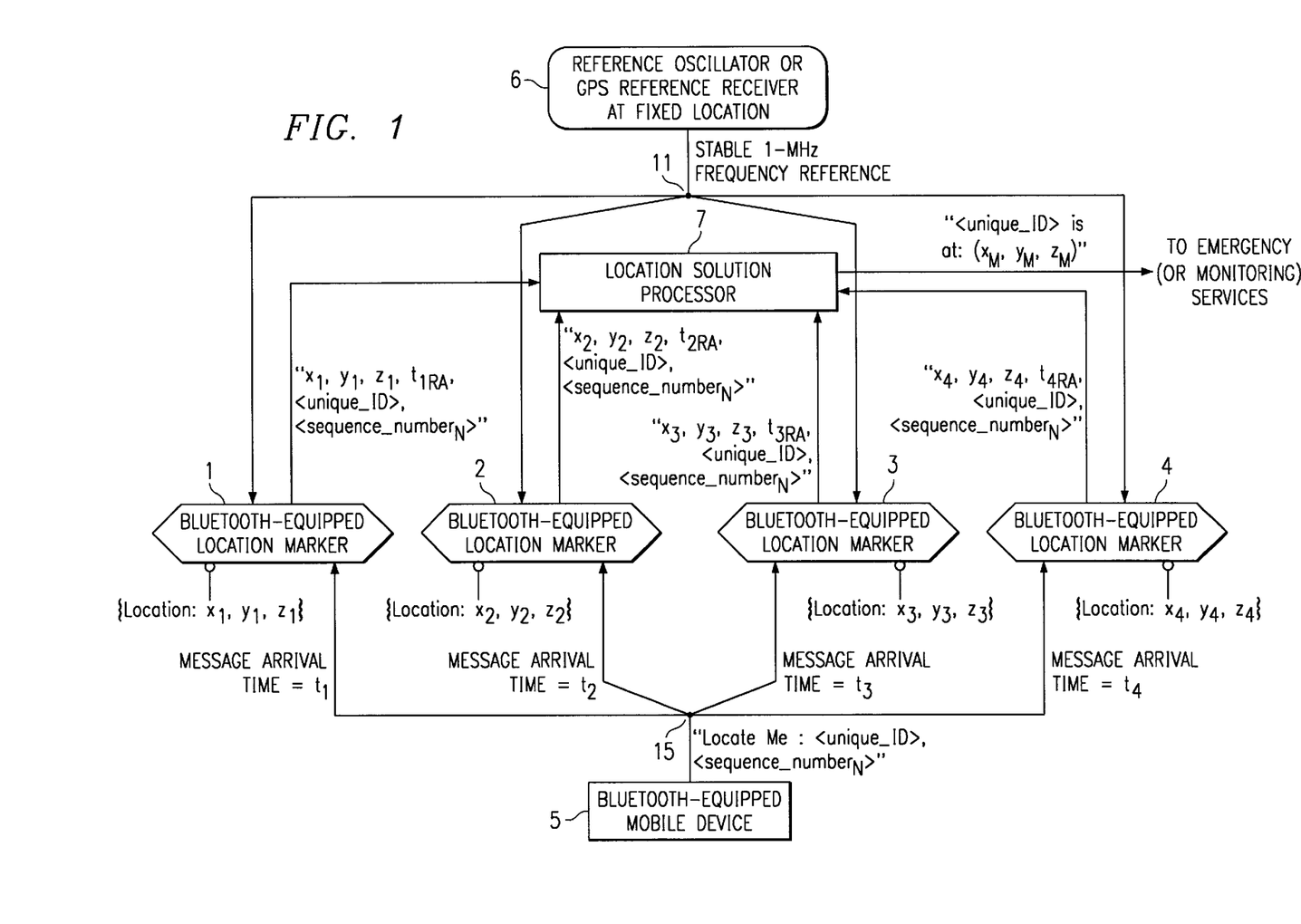
FIG. 1 diagrammatically illustrates pertinent portions of an exemplary embodiment of a wireless communication system including location determination according to the invention.

FIG. 1 diagrammatically illustrates pertinent portions of an exemplary embodiment of a wireless communication system which can implement location estimation techniques according to the invention. The embodiment of FIG. 1 includes a wireless mobile communication device 5 whose location is to be determined by the system of FIG. 1. In the example of FIG. 1, the mobile communication device 5 is a Bluetooth device, for example a personal digital assistant (PDA), a palmtop computer, an ultralight laptop computer, or a wireless telephone, operating in a Bluetooth system. The device 5 includes a Bluetooth transceiver for use in a variety of short distance wireless information exchanges. One such information exchange is a "Locate Me" message which is transmitted via a Bluetooth wireless communication link at 15 to a plurality of location markers 1–4 which can be conventionally configured to receive Bluetooth wireless communications. As shown in FIG. 1, the locations markers 1–4 are located at different geographic locations. For example, location marker 1 is located at Cartesian coordinates $x_1, y_1, z_1$ and location marker 2 is located at Cartesian coordinates $x_2, y_2, z_2$, location marker 3 is located at Cartesian coordinates $x_3, y_3, z_3$, and location marker 4 is located at Cartesian coordinates $x_4, y_4, z_4$. The "Locate Me" message transmitted by the mobile device 5 arrives at the various location markers 1–4 at respective arrival times, namely $t_1$ for location marker 1, $t_2$ for location marker 2, $t_3$ for location marker 3 and $t_4$ for location marker 4.

According to the invention, the "Locate Me" Bluetooth message includes, for example, a 1 MHz signal embedded therein, and the location markers 1–4 measure the phase difference between this embedded signal and a 1 MHz sine wave frequency reference signal 11 that is produced at a fixed location by a stationary reference oscillator 6 and is distributed to the location markers 1–4. The reference signal 11 can be distributed, for example, by coaxial cable, modified Ethernet or latency-free wireless means. The reference oscillator 6 can be a GPS reference receiver, or any suitable stable reference source, for example, an oven-stabilized quartz oscillator or a Cesium or Rubidium atomic standard oscillator. One reference oscillator 6 may be used to distribute the reference signal 11 over an entire building or campus. In some embodiments, the reference signal 11 has a stability at least four times that of the internal clock of the mobile device 5.

The 1 MHz signal embedded in the "Locate Me" message can be set, for example, to 101010101010. For the set of location markers 1–4 that receive the same "Locate Me" message from the mobile device 5, the phase difference determined at each location marker is indicative of the time of arrival of the "Locate Me" message at that location marker, relative to the time of arrival of the "Locate Me" message at the other location markers.

Each of the location markers 1–4 provides to a location solution processor 7 information indicative of the relative time of arrival of the "Locate Me" message at that particular location marker. This relative time of arrival information is designated in FIG. 1 as $t_{1RA}$ for location marker 1, $t_{2RA}$ for location marker 2, $t_{3RA}$ for location marker 3 and $t_{4RA}$ for location marker 4. The location solution processor 7 uses this relative time of arrival information, together with other information indicated in FIG. 1 and discussed in more detail below, to estimate the location of the mobile device 5. The estimated location is designated as $x_M$, $y_M$, $z_M$ in FIG. 1. This estimated location information can then be provided, for example, to emergency service personnel, a location monitoring application, etc.

Also as shown in FIG. 1, the "Locate Me" message transmitted by the mobile device 5 includes a unique identifier which is uniquely associated with the mobile device, designated as "unique_ID" in FIG. 1, and also includes a sequence number that the mobile device 5 assigns to each individual "Locate Me" message, which sequence number is designated in FIG. 1 as "sequence_number$_N$". Thus, if the mobile device 5 transmits a sequence of individual "Locate Me" messages, the eighth message in the sequence would have a sequence number of, for example, 8. In addition to the aforementioned relative time of arrival information, the location markers 1–4 provide to the location solution processor 7 the unique identifier and the sequence number associated with the "Locate Me" message from which the relative time of arrival information has been determined. The location markers 1–4 also provide their respective Cartesian coordinates to the location solution processor 7 along with the relative time of arrival information. In other embodiments, the location markers can simply identify themselves to the location solution processor, and the corresponding Cartesian coordinates of the respective location markers can be retrieved by the location solution processor from its own internal storage.

The combination of the unique identifier, unique_ID, and the sequence number, sequence_number$_N$, provides a unique "tag" associated with the relative time of arrival information and the Cartesian coordinates provided by a given location marker. The relative time of arrival information and Cartesian coordinates supplied by the different location markers must all have the same "tag" in order to be used by the location solution processor 7 to calculate the location of the mobile device 5 (or any other mobile device).

Figure 2:
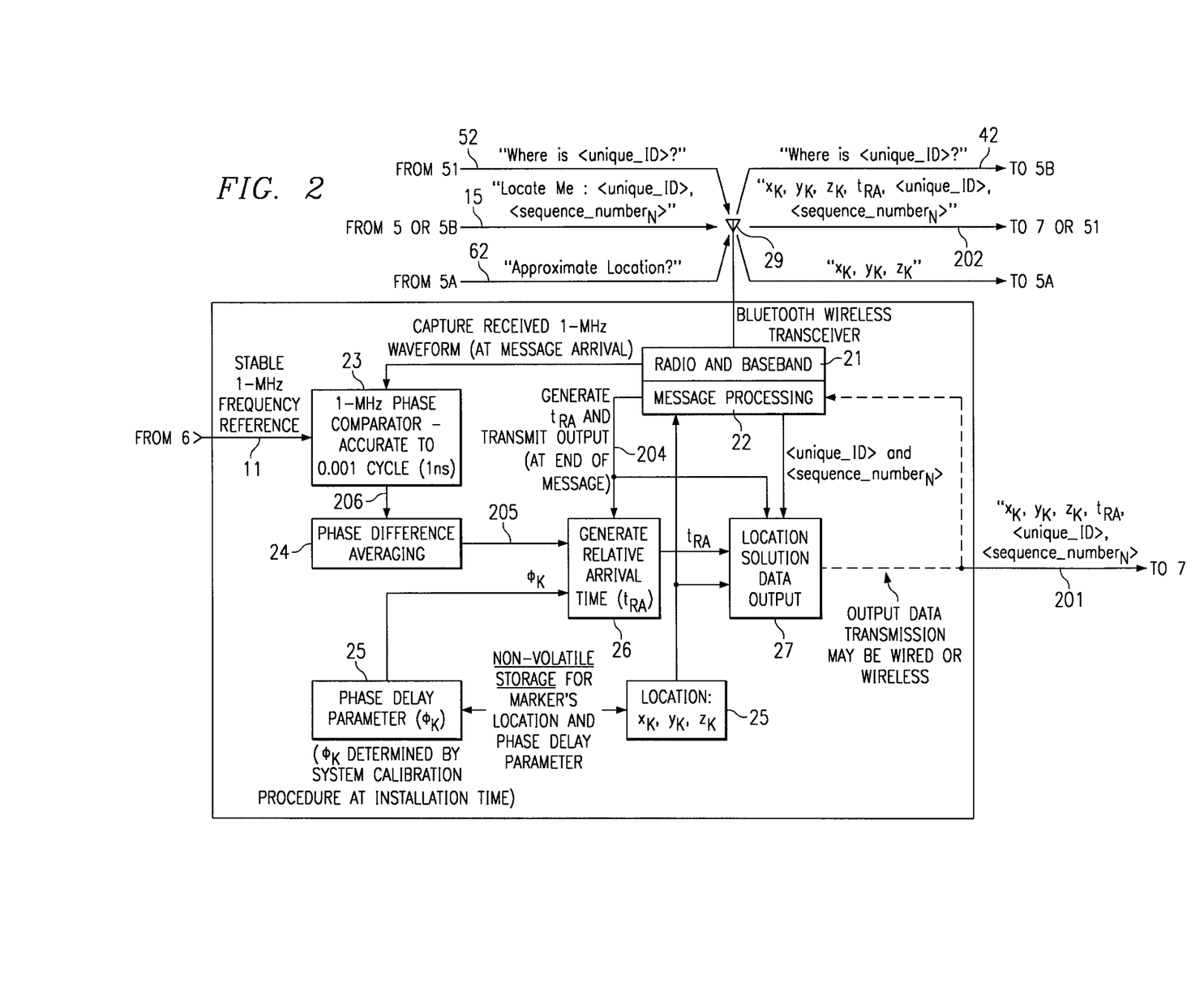
FIG. 2 diagrammatically illustrates pertinent portions of exemplary embodiments of a location marker according to the invention.

FIG. 2 diagrammatically illustrates pertinent portions of exemplary embodiments of the location markers of FIG. 1. The location marker illustrated in FIG. 2 includes a non-volatile storage section designated generally at 25. The Cartesian coordinates $x_K$, $y_K$, $z_K$ of the location marker can be stored in the storage section 25 when the location marker is initially positioned, for example affixed to a ceiling or wall of a building or other structure. Site surveys and interior plans used to construct the surrounding structure can be used to provide the Cartesian coordinates precisely. The Cartesian coordinate system may be defined relative to a local origin that is particularly useful for identifying relative locations within the structure. As another example, the coordinate system could be the Earth-Centered Earth-Fixed (ECEF) coordinate system conventionally used in GPS position calculations. This may be useful for identifying locations within the structure relative to locations at some distance outside of the structure.

Also at the time that the location marker is installed, a system calibration procedure can be used to measure the propagation delay from the source of the stable frequency reference 11 (see 6 in FIG. 1) to the location marker. The resulting phase delay parameter $\Phi_K$ is then also stored in the storage section 25. For a set of location markers covering a given area, such as illustrated in FIG. 1, the differences between the phase delay parameter values must be accounted for in the location solution processing (see 7 in FIG. 1), but the phase delay parameter values themselves are not required. Thus, for example, in the exemplary illustrated system using a 1 MHz frequency reference, the phase delay parameters $\Phi_K$ of the respective markers can be expressed in radians, and a phase delay value of 0.0 radians can be assigned to the location marker having the shortest propagation delay from the frequency reference source 6 of FIG. 1.

The exemplary location marker of FIG. 2 includes a Bluetooth wireless transceiver having a radio and baseband section 21 and a message processing section 22. The Bluetooth wireless transceiver permits the location marker to exchange Bluetooth wireless communications with other Bluetooth transceivers. For example, the location marker can receive the "Locate Me" message of FIG. 1 via the antenna 29 of the Bluetooth wireless transceiver. Also, the location marker can use the Bluetooth wireless transceiver to transmit to the location solution processor 7 of FIG. 1 the aforementioned relative time of arrival information, Cartesian coordinates and associated tag, as shown at 202. In other embodiments, this information can be transmitted to the location solution processor 7 via a wired connection, as illustrated generally at 201 in FIG. 2.

The exemplary location marker of FIG. 2 also includes a 1 MHz phase comparator 23 which can measure the phase difference between the stable 1 MHz reference signal 11, and the 1 MHz waveform embedded in the "Locate Me" message. This latter waveform is extracted from the "Locate Me" message by the radio and baseband section 21, and is forwarded to the phase comparator 23. In the example of FIG. 2, the phase comparator 23 has a 0.001 cycle (6.2832 milliradian) phase difference resolution capability, which corresponds to an 11.8 inch resolution in the distance between the location marker and the mobile device 5 of FIG. 1. To compensate for phase jitter in the "Locate Me" message, the phase comparator 23 measures the phase difference 206 for several successive 1 MHz cycles (e.g., 1000 or more cycles of the embedded waveform), and these successive measurements are averaged by a phase difference averager 24 to produce a phase difference average 205 for the entire "Locate Me" message.

Figure 2A:
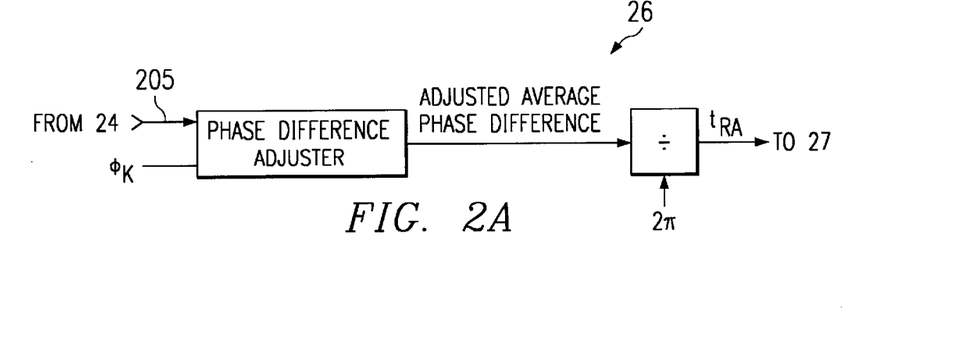
FIG. 2A illustrates a portion of FIG. 2 in greater detail.

The averager 24 outputs the average phase difference 205 to a relative arrival time generator 26 which also receives the location marker's phase delay parameter $\Phi_K$ from the storage section 25, and generates therefrom the relative time of arrival, $t_{RA}$ of the "Locate Me" message. The relative time of arrival generator 26 adds the average phase difference 205 to the phase delay parameter $\Phi_K$, thereby adjusting the average phase difference for the relative phase delay associated with distribution of the reference signal 11 from the source 6 of FIG. 1 to the location marker. The result is divided by $2\pi$ to provide the relative message arrival time $t_{RA}$ in units of microseconds. The above-described average phase difference adjustment and division operations are respectively performed by the phase difference adjuster and divider of FIG. 2A. The relative message arrival time $t_{RA}$ is then provided to a location solution data output 27 along with the Cartesian coordinates of the location marker (from the storage section 25) and the aforementioned "tag" information (sequence number of the "Locate Me" message and unique identifier of the mobile device 5). The location solution data output combines the relative message arrival time information, the Cartesian coordinates, and the tag information in a message that is transmitted to the location solution processor 7 via either the wired connection 201 (e.g., ethernet) or the wireless connection 202 (e.g., a Bluetooth radio link).

The above-described operations of the location marker of FIG. 2 are initiated when the Bluetooth transceiver detects the start of an arriving message. At this time, the radio and baseband section 21 activates the phase comparator 23 and the phase difference averager 24. When the Bluetooth transceiver has received the complete message and has identified it as a "Locate Me" message, the message processing section 22 applies a start signal 204 to both the relative arrival time generator 26 and the location solution data output 27. Also after the complete message has been received and identified as a "Locate Me" message, the message processing section 22 provides the aforementioned tag information to the location solution data output 27.

Referring again to the location solution processor 7 of FIG. 1, this processor can be, for example, dedicated to a particular network of location markers for the purpose of calculating precise locations using information received from those location markers. In one exemplary embodiment, the location solution processor 7 uses information from at least 4 non-coplanar location markers and solves simultaneous equations derived from the Cartesian coordinates of the location markers and the differences between the relative times of arrival $t_{RA}$ reported by the location markers.

Figure 3:
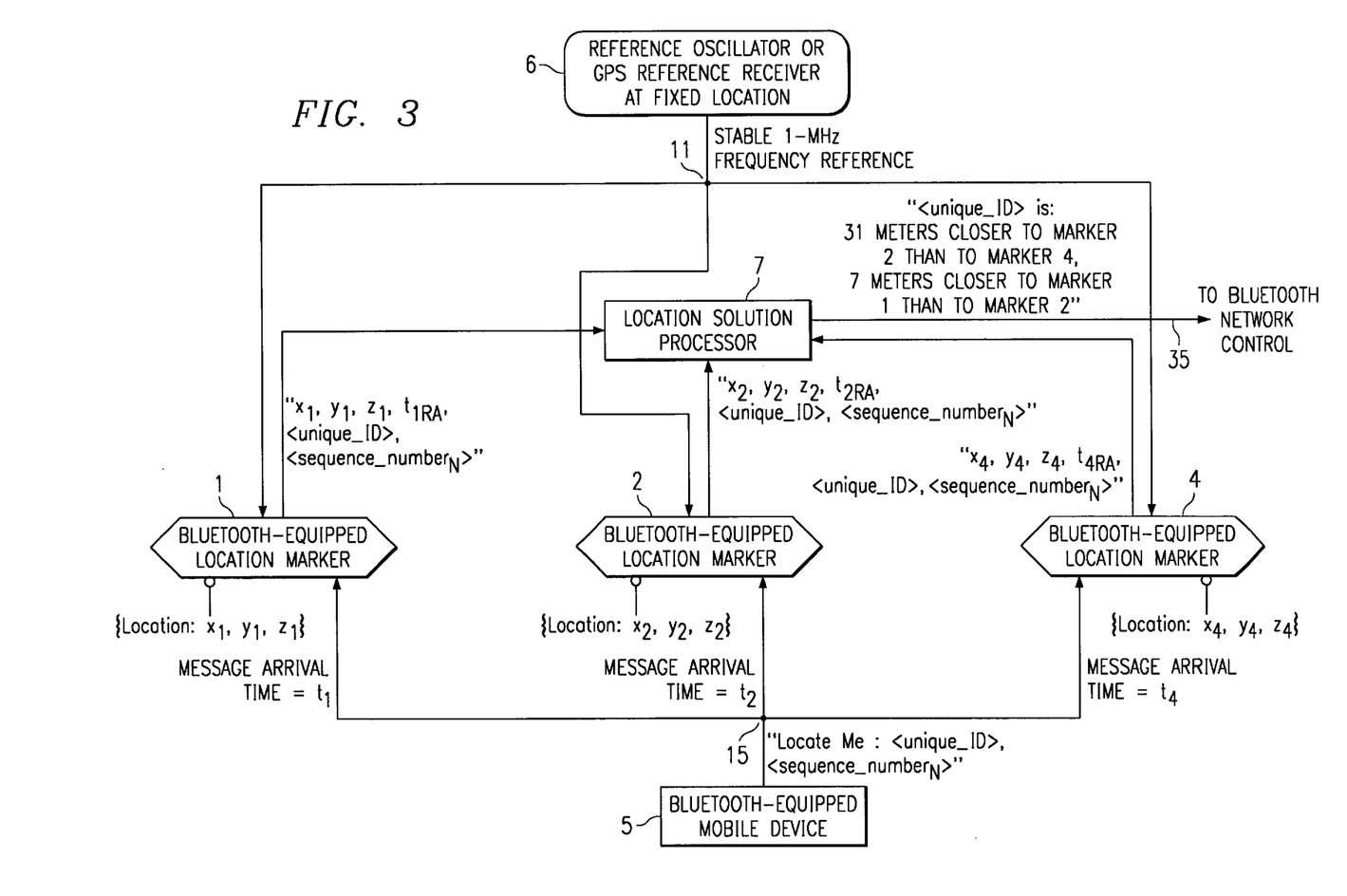
FIG. 3 diagrammatically illustrates further capabilities of the embodiment of FIG. 1.

Exemplary FIG. 3 is generally similar to FIG. 1, but illustrates that, even when information is available from only three location markers, namely location markers 1, 2 and 4, the location solution processor 7 can still determine the relative proximity of the mobile device 5 to those location markers. In the example of FIG. 3, the location solution processor uses the information reported by the location markers 1, 2 and 4 to determine that the mobile device 5 is 31 meters closer to location marker 2 than to location marker 4, and is 7 meters closer to location marker 1 than to location marker 2. This relative proximity information is output from the location solution processor 7 at 35, and can be used, for example, by Bluetooth network control for routing messages and balancing message traffic in a Bluetooth network.

Figure 4:
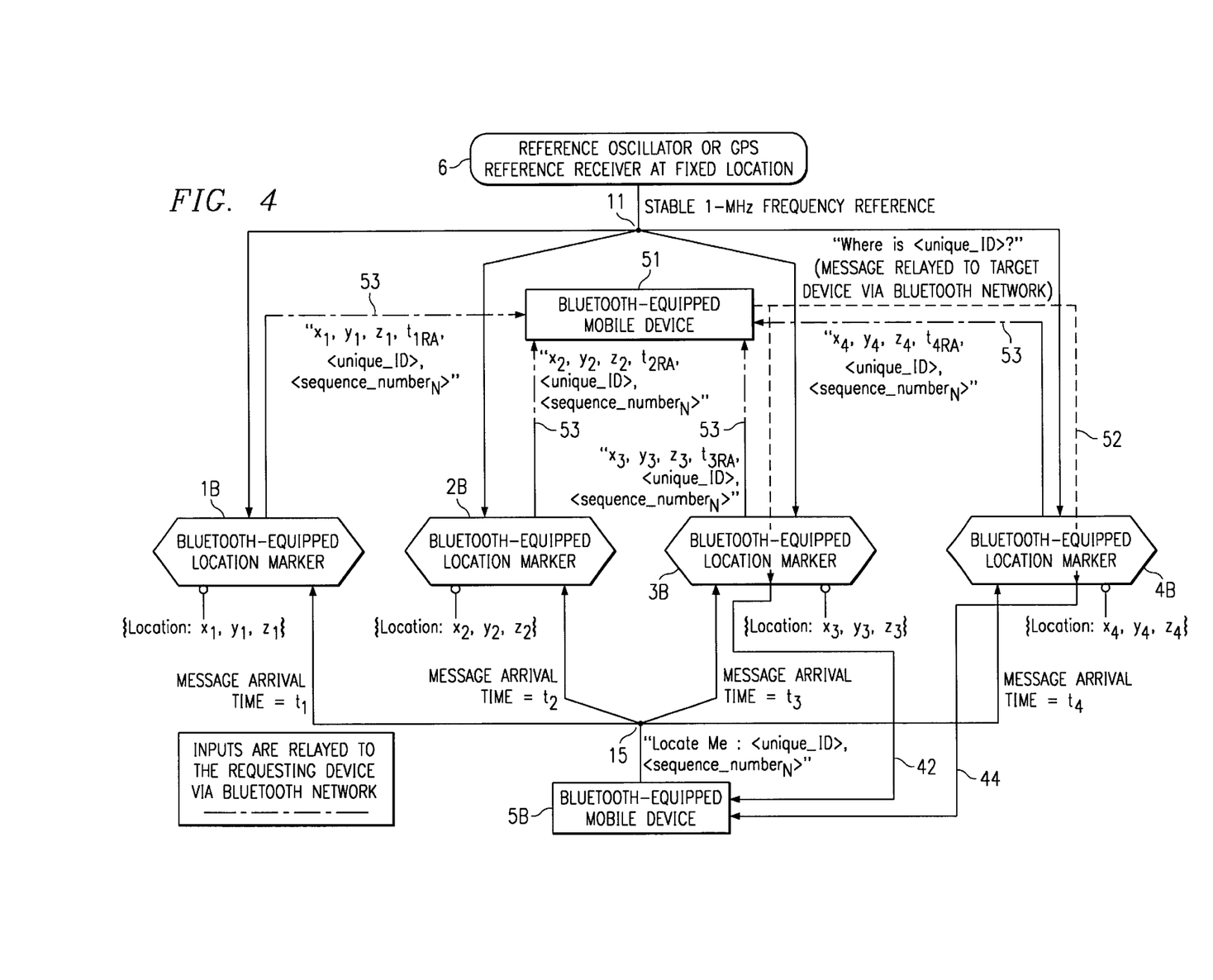
FIG. 4 diagrammatically illustrates pertinent portions of an embodiment similar to FIG. 1 but wherein the location solution processor is provided in a mobile device which can initiate location estimation with respect to another mobile device.

Exemplary FIG. 4 is also generally similar to FIG. 1, except another wireless mobile communication device 51 (a Bluetooth device in the example of FIG. 4) initiates the process of estimating the location of a mobile communication device 5B. The process is initiated when the mobile device 51 broadcasts at 52 a digitally signed "Where Is" message that includes the unique identifier of the mobile device 5B. The message at 52 can be relayed through the Bluetooth network to device 5B, for example via the transceivers of one or more of the location markers 1B–4B, as shown at 42 and 44. This "Where Is" message relaying is also illustrated in FIG. 2, where the "Where Is" message can be recognized by the message processing section 22 and relayed accordingly.

When the mobile device 5B receives the relayed message and recognizes that the message includes its unique identifier, the mobile device 5B first examines the digital signature to determine whether the originator of the "Where Is" message (mobile device 51) is authorized to know the location of mobile device 5B. If the mobile device 51 is authorized to know the location of the mobile device 5B, then the mobile device 5B begins transmitting the aforementioned "Locate Me" messages, and the location estimation can thereafter proceed generally as described above with respect to FIG. 1. Note that the location markers 1B–4B make their respective reports to the mobile device 51 (which is identified by the digital signature in the "Where Is" message) via the Bluetooth network as illustrated generally at 53. The mobile device 51 can include the functionality of the location solution processor 7 of FIG. 1 in order to calculate the precise location of the mobile device 5B. The above-described operation of the FIG. 4 embodiment can be useful, for example, when a parent in possession of mobile device 51 wants to determine the location of a lost child who possesses the mobile device 5B.

Figure 5:
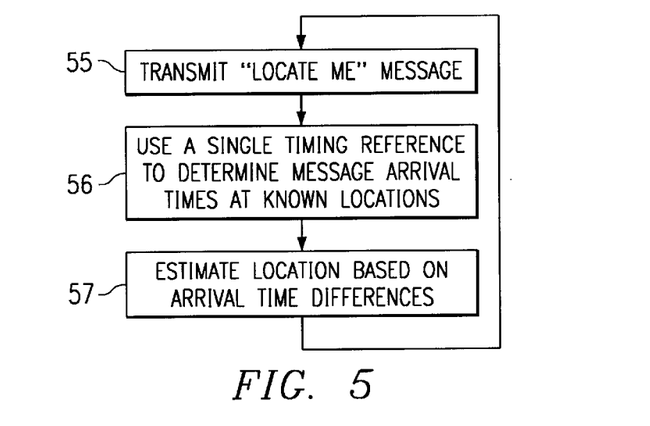
FIG. 5 illustrates exemplary operations which can be performed by the embodiments of FIGS. 1–4.

FIG. 5 illustrates exemplary operations which can be performed by the embodiments of FIGS. 1–4. After transmission of the "Locate Me" message at 55, a single timing reference (e.g., a stable 1 MHz sine wave) is used at 56 to determine the times of arrival of the "Locate Me" message at a plurality of known locations. Thereafter at 57, the differences between the respective times of arrival are used to estimate the location of the mobile device that transmitted the "Locate Me" message.

Figure 6:
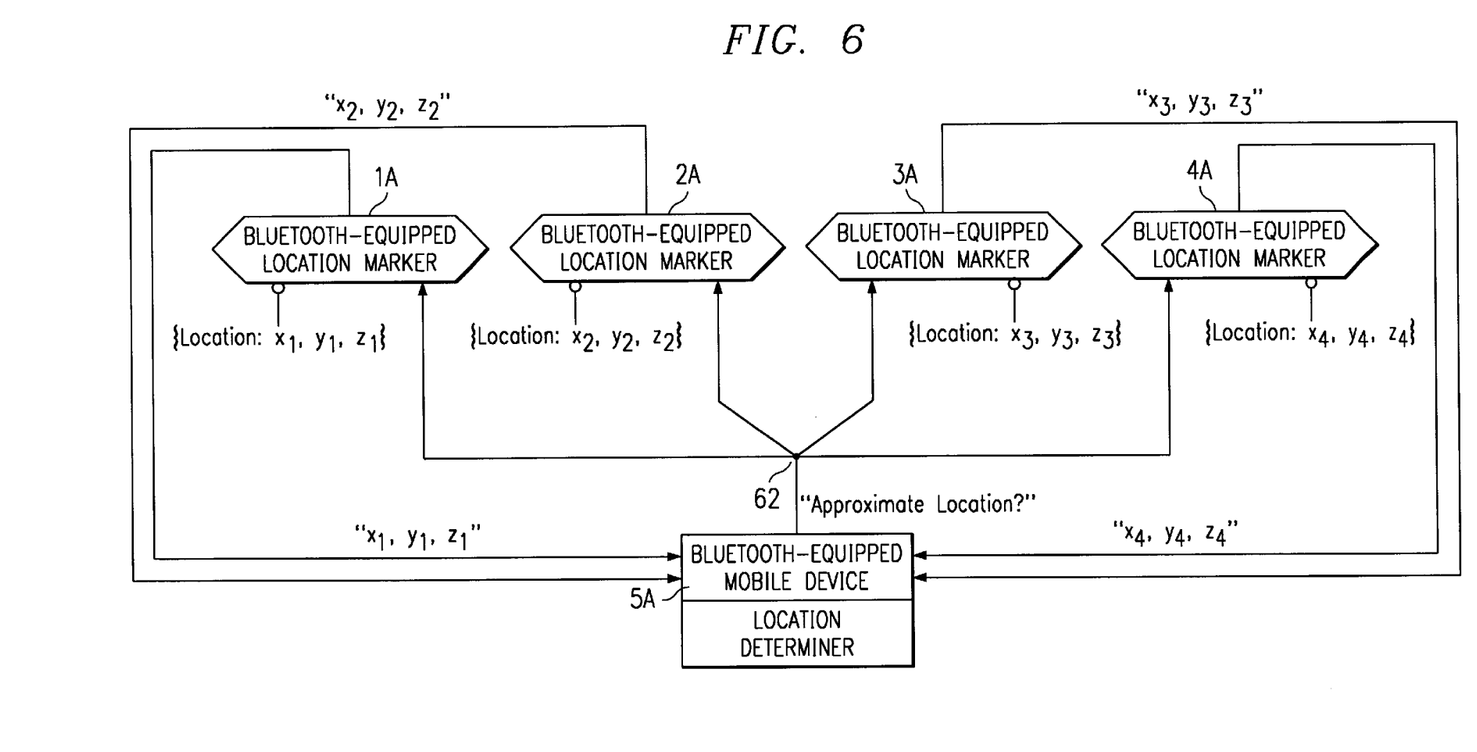
FIG. 6 diagrammatically illustrates pertinent portions of an exemplary embodiment of a wireless communications system according to the invention that can roughly approximate the location of a mobile communication device.

FIG. 6 diagrammatically illustrates pertinent portions of a further exemplary embodiment of a wireless communication system according to the invention. In the embodiment of FIG. 6, a Bluetooth-equipped wireless mobile communication device 5A broadcasts an "Approximate Location?" message over a Bluetooth wireless communication link at 62. Each of the location markers 1A–4A that receives the "Approximate Location?" interrogatory responds by transmitting its Cartesian coordinates to the mobile device 5A. As one example, if the mobile device 5A transmits the "Approximate Location?" message at a predetermined, relatively low power level, and receives one or more responses from the location markers 1A–4A, then the location of the mobile device 5A lies within a predetermined distance (e.g., approximately 10 meters) of the Cartesian coordinates specified in the location marker response(s). As another example, if the mobile device 5A transmits the "Approximate Location?" message at a predetermined, relatively high power and receives one or more responses, then the mobile device 5A is known to be located within another predetermined distance (e.g., approximately 100 meters) of the Cartesian coordinates specified in the location marker response(s). The device 5A includes a location estimator which receives the response(s) and can estimate the device's location based on the response(s) and the corresponding Cartesian coordinates.

For example, in FIG. 6, if only the location marker 1A responds to the low-power message, then the mobile device 5A is located within, in this example, approximately 10 meters of the Cartesian coordinates $x_1$, $y_1$, $z_1$. Also, if all four location markers 1A–4A in FIG. 6 respond to the high-power message, then the mobile device 5A is located, in this example, within approximately 100 meters of the Cartesian coordinates of each of the location markers 1A–4A. The location information obtained by using the "Approximate Location?" message can then be used by the mobile device 5A to determine, for example, where the nearest automated teller machine is located, or travel directions from its current location to a desired location. The above-described interaction of the location markers 1A–4A with the mobile device 5A is also illustrated in FIG. 2, where the "Approximate Location?" message can be recognized (or not) by the message processing section 22 and responded to appropriately.

Figure 7:
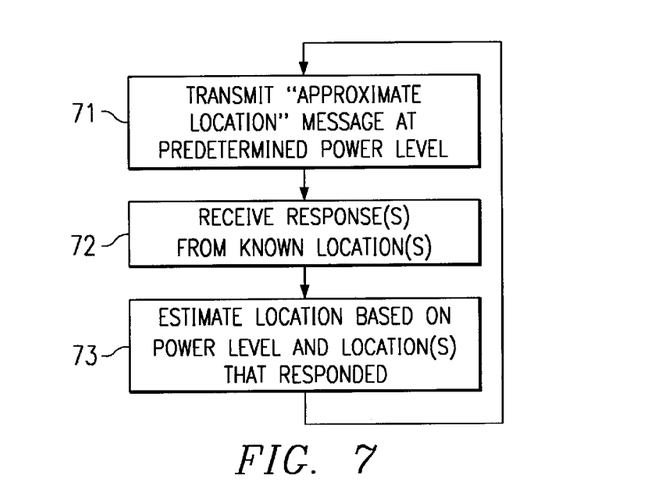
FIG. 7 illustrates exemplary operations which can be performed by the embodiment of FIG. 6.

FIG. 7 illustrates exemplary operations which can be performed by the embodiment of FIG. 6. The "Approximate Location?" message is transmitted at a predetermined power level at 71. Thereafter, the mobile device receives the response(s) from the known location(s) at 72. Thereafter at 73, the approximate location of the mobile device 5A is estimated based on the power level that was used to transmit the "Approximate Location?" message and the location(s) that responded to the message.

It should be clear from the foregoing description that the operational features of the exemplary location markers 1, 1A and 1B can be combined together in a single location marker embodiment according to the invention, and that the operational features of the mobile devices 5, 5A and 5B can be combined together in a single mobile device embodiment according to the invention. Moreover, it will be evident to workers in the art that the above-described wireless mobile communication device embodiments according to the invention can be readily implemented by, for example, suitable modifications in software, hardware, or a combination of software and hardware in conventional wireless mobile communication devices, for example Bluetooth devices.

As demonstrated above, the present invention does not depend on the ability to receive signals directly from GPS satellites while inside large structures whose walls and ceilings attenuate or block satellite signals. Also, location estimation according to the invention does not depend on communication between wireless telephones and their base stations. If the location markers of the present invention are affixed to the ceilings and permanent walls of a large structure, a user's location can be determined anywhere within the structure, without any need for the user to exit the structure or move to its periphery for better wireless reception. Advantageously, the invention also does not depend on any clock in the mobile device that is being located, does not use measurements of range or transmission direction in the location estimation process, and does not utilize received signal power measurements as indirect measures of range. There is also no dependence on multi-element steerable antennas to determine the direction from which a transmitted signal is coming. Other exemplary advantages of the invention include the fact that the location markers of the invention can be used to transmit (e.g., relay) any desired information to the mobile devices operating in the wireless communication system, and the location markers do not require accurate and expensive clocks.

Although exemplary embodiments of the invention are described above in detail, this does not limit the scope of the invention, which can be practiced in a variety of embodiments.

What is claimed is:

1. A method of determining the location of a wireless mobile communication device operating in a wireless communication system, comprising:

the wireless mobile communication device transmitting a first waveform over a wireless communication link;

receiving the first waveform at each of a plurality of known locations;

receiving at each of the plurality of known locations a reference waveform produced by a stationary source;

for each of the known locations, producing information indicative of a phase difference between the first waveform as received at the known location and the reference waveform as received at the known location; and using said information to determine the location of the wireless mobile communication device.

2. The method of claim 1, wherein said transmitting step includes the wireless mobile communication device transmitting the first waveform in response to a message transmitted by a further wireless mobile communication device.

3. The method of claim 1, wherein said first waveform and said reference waveform are periodic waveforms, said producing step including, for each of the known locations, determining a plurality of phase differences between cycles of the first waveform and corresponding cycles of the reference waveform.

4. The method of claim 3, wherein said producing step includes, for each of the known locations, averaging the associated plurality of phase differences to produce an average phase difference.

5. The method of claim 4, wherein said producing step includes, for each of the known locations, adjusting the associated average phase difference to produce an adjusted phase difference that accounts for a known phase delay associated with providing the reference waveform from the stationary source to the known location.

6. The method of claim 5, wherein said producing step includes, for each of the known locations, converting the adjusted phase difference into a quantity of time.

7. The method of claim 1, wherein said using step includes determining respective distances between the wireless mobile communication device and a plurality of the known locations.

8. The method of claim 1, wherein the wireless mobile communication device is a Bluetooth device.

9. A wireless communication system, comprising:

a wireless mobile communication device for transmitting a first waveform over a wireless communication link;

a stationary reference source for producing a reference waveform;

a plurality of stationary location markers respectively provided at a plurality of predetermined locations for receiving the first waveform, each said location marker coupled to said reference source for receiving the reference waveform;

each said location marker responsive to the first waveform and the reference waveform for producing information indicative of a phase difference between the first waveform and the reference waveform as received at said location marker; and a location determiner coupled to said location markers for receiving said information from said location markers and determining from said information the location of said wireless mobile communication device.

10. The system of claim 9, wherein said location determiner is coupled to said location markers via a wireless communication link.

11. The system of claim 9, wherein said location determiner is coupled to said location markers via a wired connection.

12. The system of claim 9, wherein said reference source includes one of a GPS receiver, an oven-stabilized quartz oscillator, a Cesium atomic oscillator and a Rubidium atomic oscillator.

13. The system of claim 9, including a further wireless mobile communication device coupled to said first-mentioned wireless mobile communication device via a wireless communication link for requesting said first-mentioned wireless mobile communication device to transmit said first waveform, and wherein said location determiner is provided in said further wireless mobile communication device.

14. The system of claim 13, wherein the wireless communication link that couples said further wireless mobile communication device to said first-mentioned wireless mobile communication device includes one of said location markers.

15. The system of claim 9, wherein said wireless mobile communication device and said location markers are provided as Bluetooth communication devices.

16. An apparatus for use in determining the location of a wireless mobile communication device operating in a wireless mobile communication system, comprising:

an input fixed at a known location for receiving a first waveform from the wireless mobile communication device via a wireless communication link;

a second input fixed at said known location for receiving a reference waveform from a stationary source;

a phase comparator coupled to said inputs for determining a phase difference between said first waveform and said reference waveform as received at said inputs; and an output coupled to said phase comparator for outputting information indicative of said phase difference to a location determiner which can use said information to determine the location of the wireless mobile communication device.

17. The apparatus of claim 16, wherein said first waveform and said reference waveform are periodic waveforms, said phase comparator operable for determining a plurality of phase differences between cycles of the first waveform and corresponding cycles of the reference waveform.

18. The apparatus of claim 17, including an averager coupled to said phase comparator for receiving said plurality of phase differences and averaging said phase differences to produce an average phase difference.

19. The apparatus of claim 18, including a storage section for storing information indicative of a phase delay associated with providing said reference waveform from the stationary source to said second input, and including a phase adjuster coupled to said averager and said storage section, said phase adjuster responsive to said phase delay information and said average phase difference for adjusting said average phase difference to produce an adjusted phase difference that accounts for said phase delay.

20. The apparatus of claim 16 provided as a Bluetooth device.

\* \* \* \* \*